US005359469A

United States Patent [19]
Ueda

[11] Patent Number: 5,359,469
[45] Date of Patent: Oct. 25, 1994

[54] INFORMATION DATA RECORDING APPARATUS

[75] Inventor: Mamoru Ueda, Kanagawa, Japan

[73] Assignee: Sony Corporation, Tokyo, Japan

[21] Appl. No.: 40,288

[22] Filed: Mar. 30, 1993

[30] Foreign Application Priority Data

Apr. 1, 1992 [JP] Japan .................................. 4-080067

[51] Int. Cl.⁵ ............................ G11B 5/00; G11B 5/09
[52] U.S. Cl. ............................................ 360/53; 360/32
[58] Field of Search ................... 360/10.1, 18, 27, 32, 360/48, 53; 358/335, 906, 909

[56] References Cited

U.S. PATENT DOCUMENTS

| | | | |
|---|---|---|---|
| 4,597,020 | 6/1986 | Wilkinson | 360/32 X |
| 4,785,349 | 11/1988 | Keith et al. | 358/136 |
| 4,882,732 | 11/1989 | Kaminaga | 371/2.2 |
| 5,032,927 | 7/1991 | Watanabe et al. | 358/335 |
| 5,060,077 | 10/1991 | Koya et al. | 358/335 |
| 5,179,451 | 1/1993 | Takeshita et al. | 358/335 |
| 5,191,437 | 3/1993 | Kim | 352/335 X |
| 5,223,989 | 6/1993 | Craig et al. | 360/46 |
| 5,229,986 | 7/1993 | Mizokami et al. | 360/51 X |
| 5,237,554 | 8/1993 | Shenshu et al. | 360/51 X |
| 5,249,053 | 9/1993 | Jain | 358/909 X |
| 5,257,141 | 10/1993 | Matsumi et al. | 360/48 X |

FOREIGN PATENT DOCUMENTS 0335346 10/1989 European Pat. Off. .............. 360/53

Primary Examiner—Donald Hajec
Assistant Examiner—Thien Minh Le
Attorney, Agent, or Firm—William S. Frommer; Alvin Sinderbrand

[57] ABSTRACT

When a video signal is recorded on a magnetic tape (14), a high frequency signal component of data converted by a DCT (discrete cosine transform) converter (3) in a DCT fashion or an outer code is recorded on a recording track at its beginning portion in which a waveform of a reproduced output is considerably deteriorated in amplitude when a reproducing head (15) starts to reproduce the recording track. Also, a low frequency signal component of data converted by the DCT converter (3) in a DCT fashion is recorded on the recording track at its succeeding portion in which the reproducing head (15) can stably reproduce the recording track by a recording head (13). The high frequency signal component or outer code is recorded on the area corresponding to the track at its beginning portion in which a waveform of a reproduced output is considerably deteriorated in amplitude when the reproducing head starts to reproduce the same upon playback and the low frequency signal component of data is recorded on the track at its succeeding portion in which the tracing of the reproducing head is stabilized relatively so that, even if a reproducing error occurs and increases because a waveform of a reproduced output is deteriorated in amplitude when the reproducing head starts to trace the recording track, then an amount that a picture quality of a reproduced signal is deteriorated by such error can be reduced considerably.

17 Claims, 6 Drawing Sheets

| DC | AC2 | AC3 | AC9 |
|---|---|---|---|
| AC1 | AC4 | AC8 | AC10 |
| AC5 | AC7 | AC11 | AC14 |
| AC6 | AC12 | AC13 | AC15 |

INFORMATION DATA RECORDING APPARATUS

BACKGROUND OF THE INVENTION

1. Field of the Invention

The present invention relates to an information data recording apparatus for use in a video tape recorder (VTR) having a digital format or the like, for example.

2. Description of the Prior Art

In conventional digital video tape recorders, as U.S. Pat. No. 4,799,113 describes, an input analog video signal is converted into digital data and outer code data for error correction is added to the digital data. Then, the digital data added with the outer code data is shuffled, the shuffled digital data is multiplexed, inner code data for error correction is added to the digital data thus multiplexed and the digital data added with the inner code data is processed in a channel-coding fashion. Further, the digital data that was processed in a channel-coding fashion is amplified and then supplied to a recording rotary head such that the digital data is recorded by the recording rotary head so as to form oblique video tracks.

Figure 1:
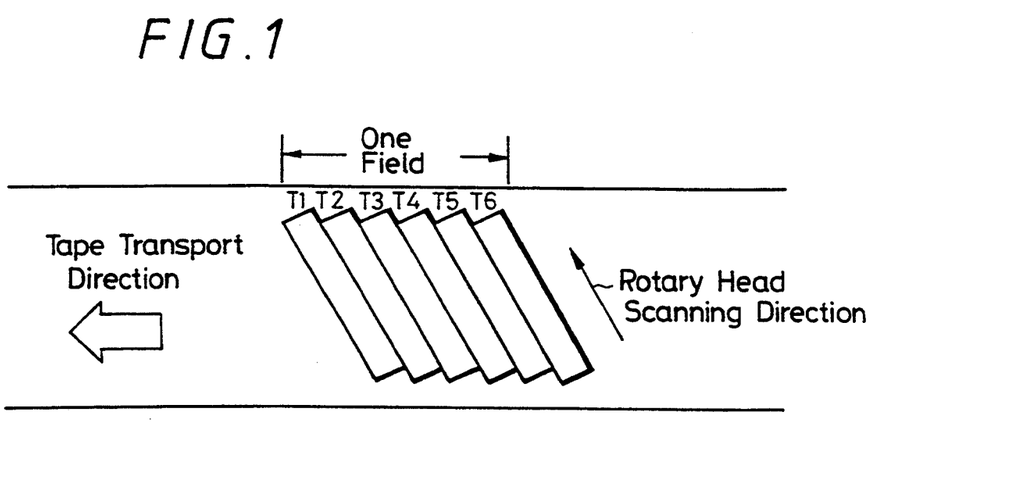
FIG. 1 is a diagram showing a tape format of a digital video tape recorder (DVTR)

FIG. 1 of the accompanying drawings shows a digital video tape recorder (DVTR) tape format utilized when digital data is recorded by the digital VTR. As shown in FIG. 1, in the above digital VTR, video data of one field is recorded by six video tracks.

Figure 2:
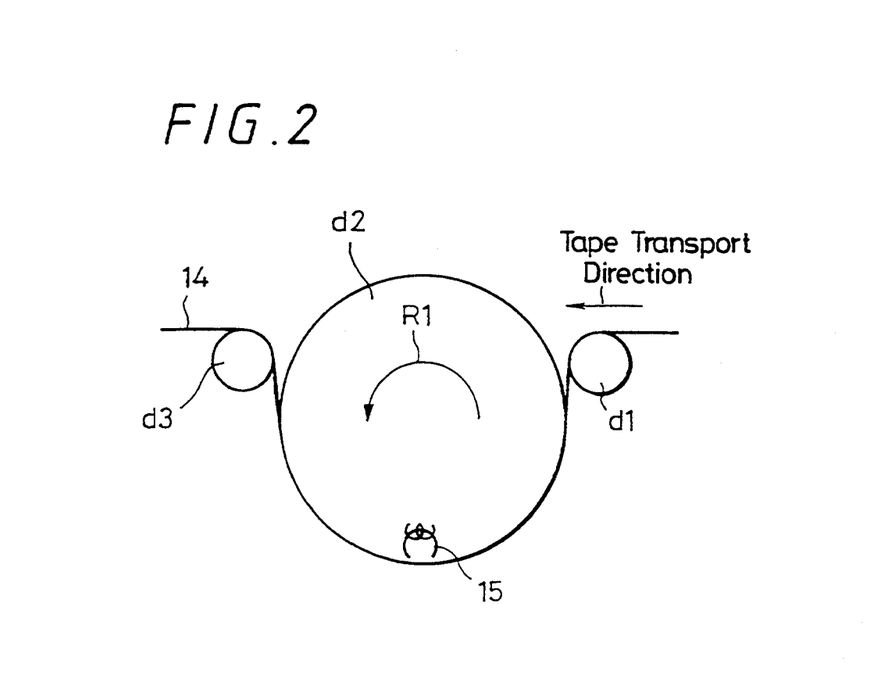
FIG. 2 is a diagram showing a tape and a rotary head assembly of the digital video tape recorder, and to which references will be made in explaining the condition that recorded video data is reproduced by a reproducing head from a magnetic tape.

When video data recorded on a magnetic tape is reproduced, the magnetic tape is transported in the direction shown by an open arrow in FIG. 1 and a reproducing head is rotated in the direction shown by a solid arrow in FIG. 1. More specifically, as shown in FIG. 2, a magnetic tape 14 is transported from an entrance tape guide d1 to an exit tape guide d3 and a rotary drum d2 having a reproducing head 15 mounted thereon is rotated as shown by an arrow R1 in FIG. 2. The magnetic head 15 sequentially scans video tracks T1, T2, T3, T4, T5, T6 to reproduce recorded video data. Then, the reproduced data or signal is equalized and amplified. The reproduced signal thus amplified is decoded, de-shuffled and the reproduced signal thus de-shuffled is error-corrected. The reproduced signal thus error-corrected is error-concealed and the reproduced signal thus error-concealed is output as a digital or analog video signal.

In the digital VTR, if data recorded on the narrow tracks on the magnetic tape 14 is reproduced by the reproducing head 15 mounted on the rotary drum d2, when the reproducing head 15 starts to trace the magnetic tape 14, a waveform of a reproduced signal is deteriorated in amplitude by a spacing loss caused by a so-called air film or a so-called impact error of the reproducing head 15 relative to the magnetic tape 14, etc.

Figure 3:
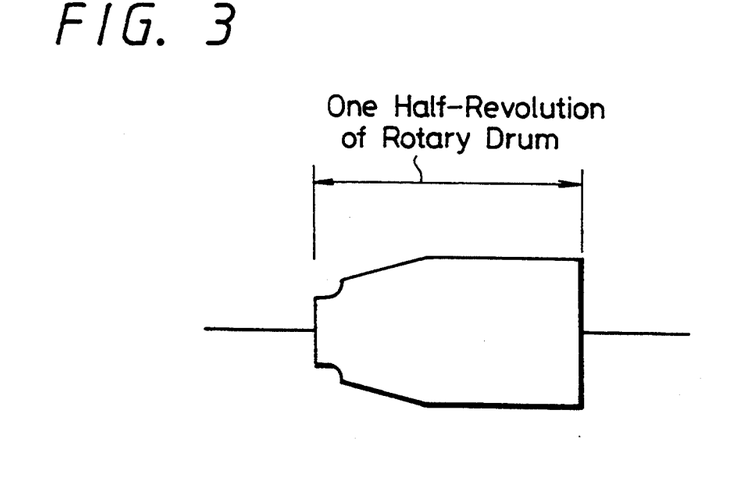
FIG. 3 is a diagram used to explain a phenomenon that a waveform of a reproduced signal is deteriorated in amplitude when a reproducing head just starts to trace a track.

FIG. 3 shows an example of such phenomenon that a waveform of a reproduced signal is deteriorated in amplitude. Because the waveform of the reproduced signal is deteriorated in amplitude as shown in FIG. 3, a reproducing error tends to occur and increase at the beginning (portion at which the reproducing head 15 starts to scan) of the video track. There is then the disadvantage that a picture quality of a reproduced picture will be deteriorated.

Figure 4:
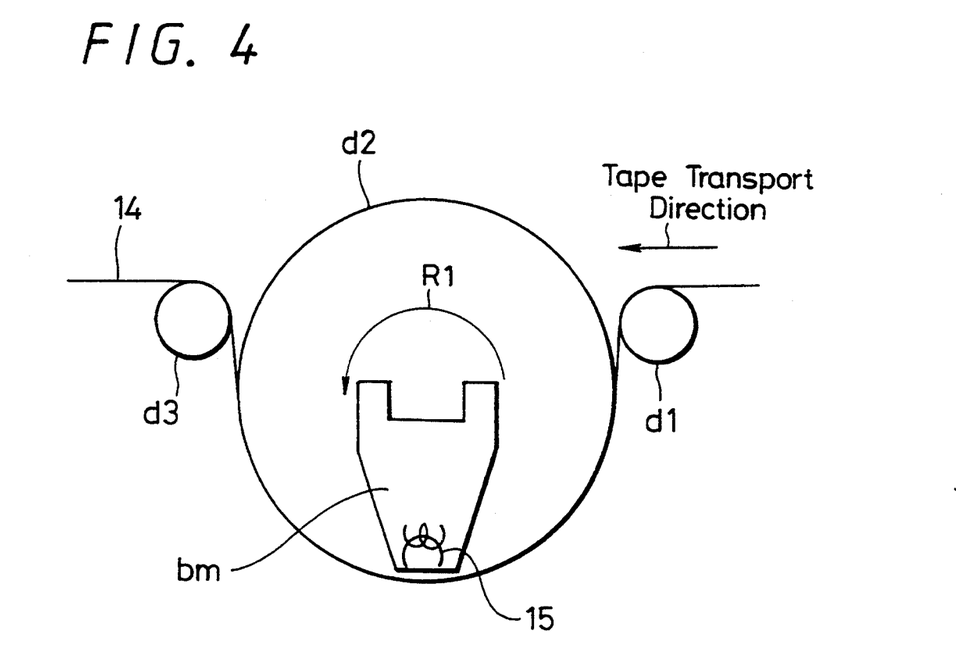
FIG. 4 is a diagram showing a tape and a rotary head assembly of the digital video tape recorder, and to which references will be made in explaining a so-called dynamic tracking playback.
Figure 5:
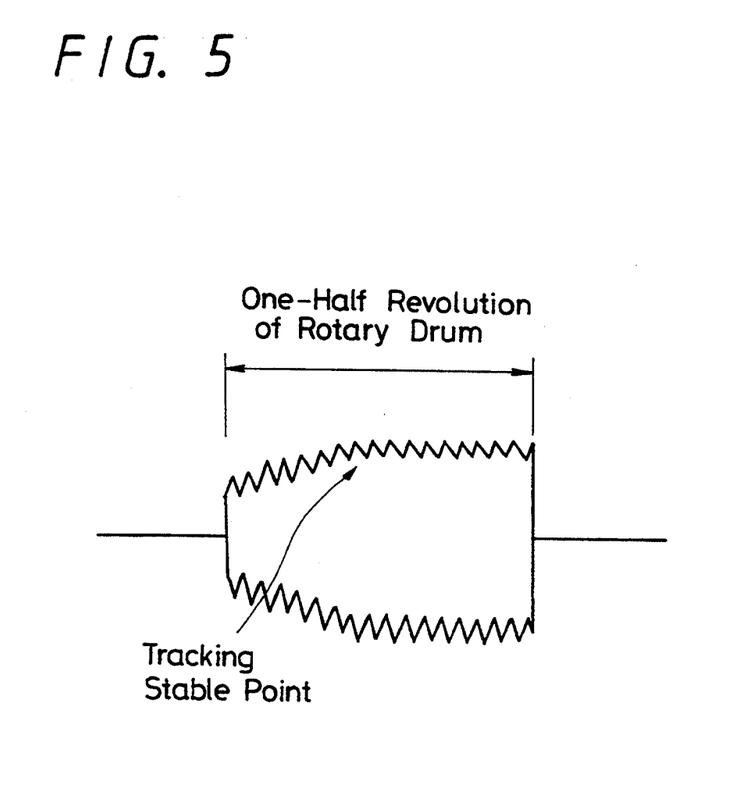
FIG. 5 is a diagram used to explain a phenomenon that a waveform of a reproduced signal is deteriorated in amplitude when a dynamic tracking reproducing head just starts to trace the track.

When the magnetic tape 14 is reproduced by a DT (dynamic tracking head) formed of a bimorph plate bm and the reproducing head 15 mounted on the bimorph plate bm in a so-called dynamic tracking fashion as shown in FIG. 4, the DT head effects the tracking from the beginning of the video track by some suitable methods such as a wobbling or the like. However, until the tracking of the DT head is stabilized from the beginning of the video track, as shown in FIG. 5, a waveform of a reproduced signal is deteriorated in amplitude similarly as described above. As a consequence, a reproducing error tends to occur and increase. There is then the disadvantage that a picture quality of a reproduced picture will be deteriorated.

OBJECTS AND SUMMARY OF THE INVENTION

Therefore, it is an object of the present invention to provide an improved information data recording apparatus in which the aforesaid shortcomings and disadvantages encountered with the prior art can be eliminated.

More specifically, it is an object of the present invention to provide an information data recording apparatus in which, even if a reproducing error occurs at a beginning portion of a track because a waveform of a reproduced output is deteriorated in amplitude when a reproducing head starts to trace a recording medium upon playback, an amount that a picture quality of a reproduced picture is deteriorated due to such reproducing error can be reduced considerably.

It is another object of the present invention to provide an information data recording and reproducing apparatus in which, even if a reproducing error occurs at a beginning portion of a track because a waveform of a reproduced output is deteriorated in amplitude when a reproducing head starts to trace a recording medium upon playback, an amount that a picture quality of a reproduced picture is deteriorated due to such reproducing error can be reduced considerably.

As a first aspect of the present invention, there is provided an apparatus for recording a digital signal on a magnetic tape medium which comprises a circuit for orthogonal converting the digital signal, a circuit for generating outer code data for correction of an output signal of the orthogonal converting means and for combining the same to the outer data, and a circuit for rearranging an order of an output signal of the outer data generating means and for supplying the same to record heads for recording so that the outer data and the output signal of the orthogonal converting means are recorded on a different area of a track formed on the magnetic tape medium by the record heads, respectively.

As a second aspect of the present invention, there is provided an apparatus for recording a digital video signal on a magnetic tape which comprises a circuit for converting the digital video signal by using a DCT (discrete cosine transform) converter so as to generate a DCT converted video signal, a circuit for generating outer data for correction of the DCT converted video signal and for adding the same to the outer data, and a circuit for storing an output signal of the outer data generating and adding means so that the same corresponding to one field video signal is stored, and for reading out the stored output signal so that an order of the same is rearranged in a manner that the outer data is recorded on a beginning area of a track formed on the magnetic tape and the DCT converted video signal is recorded on a succeeding area to the beginning area.

According to a third aspect of the present invention, there is provided an apparatus for recording and reproducing a digital signal on and from a magnetic tape which comprises a circuit for converting the digital video signal by using a DCT (discrete cosine transform) converter so as to generate a DCT converted video signal, a circuit for generating outer data for correction of the DCT converted video signal and for adding the same to the outer data, a circuit for storing an output signal of the outer data generating and adding circuit so that the same corresponding to one field video signal is stored, and for reading out the stored output signal so that an order of the same is rearranged in a manner that the outer data is recorded on a beginning area of a track formed on the magnetic tape and the DCT converted video signal is recorded on a succeeding area to the beginning area, a circuit for reproducing a digital signal recorded on the magnetic tape, a circuit for equalizing a waveform of the reproduced digital signal, a circuit for reproducing a clock signal on the basis of the reproduced digital signal from the equalizing circuit, a circuit for converting the reproduced signal from the reproducing circuit in the form of one-bit serial data to 8-bit parallel data, a circuit for correcting a random error of the 8-bit parallel data, an identification code decoding circuit for decoding an identification code and generating an address signal on the basis of the decoded identification code, a circuit for receiving and storing the quantized digital signal and the error code signal, a circuit for correcting a burst error of the quantized digital signal by using the error code signal, a circuit connected to the correcting circuit for inverse-orthogonal transforming the quantized digital signal, and an error correcting circuit for correcting an error of an output signal from the inverse-orthogonal transforming circuit so that the error-corrected output signal is displayed as a reproduced picture.

According to a fourth aspect of the present invention, there is provided an apparatus for reproducing a digital signal from a magnetic tape which comprises a circuit for reproducing a digital signal recorded on the magnetic tape, a circuit for equalizing a waveform of the reproduced digital signal, a circuit for reproducing a clock signal on the basis of the reproduced digital signal from the equalizing circuit, a circuit for converting the reproduced signal from the reproducing circuit in the form of one-bit serial data to 8-bit parallel data, a circuit for correcting a random error of the 8-bit parallel data, an identification code decoding circuit for decoding an identification code and generating an address signal on the basis of the decoded identification code, a circuit for receiving and storing the quantized digital signal and the error code signal, a circuit for correcting a burst error of the quantized digital signal by using the error code signal, a circuit connected to the correcting circuit for inverse-orthogonal transforming the quantized digital signal, and an error correcting circuit for correcting an error of an output signal from the inverse-orthogonal transforming circuit so that the error-corrected output signal is displayed as a reproduced picture.

According to the present invention, since an information is recorded on a recording medium while the influence of playback error and the contact condition of the rotary head with the recording medium are taken into consideration, even if a playback error occurs in the first half portion of the track when a waveform of a reproduced output is deteriorated in amplitude when the reproducing head starts the reproduction upon playback, an amount that the picture quality of the reproduced picture is deteriorated due to the occurrence of the reproducing error can be reduced considerably.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

An information data recording apparatus according to an embodiment of the present invention will hereinafter be described with reference to FIG. 6.

Figure 6:
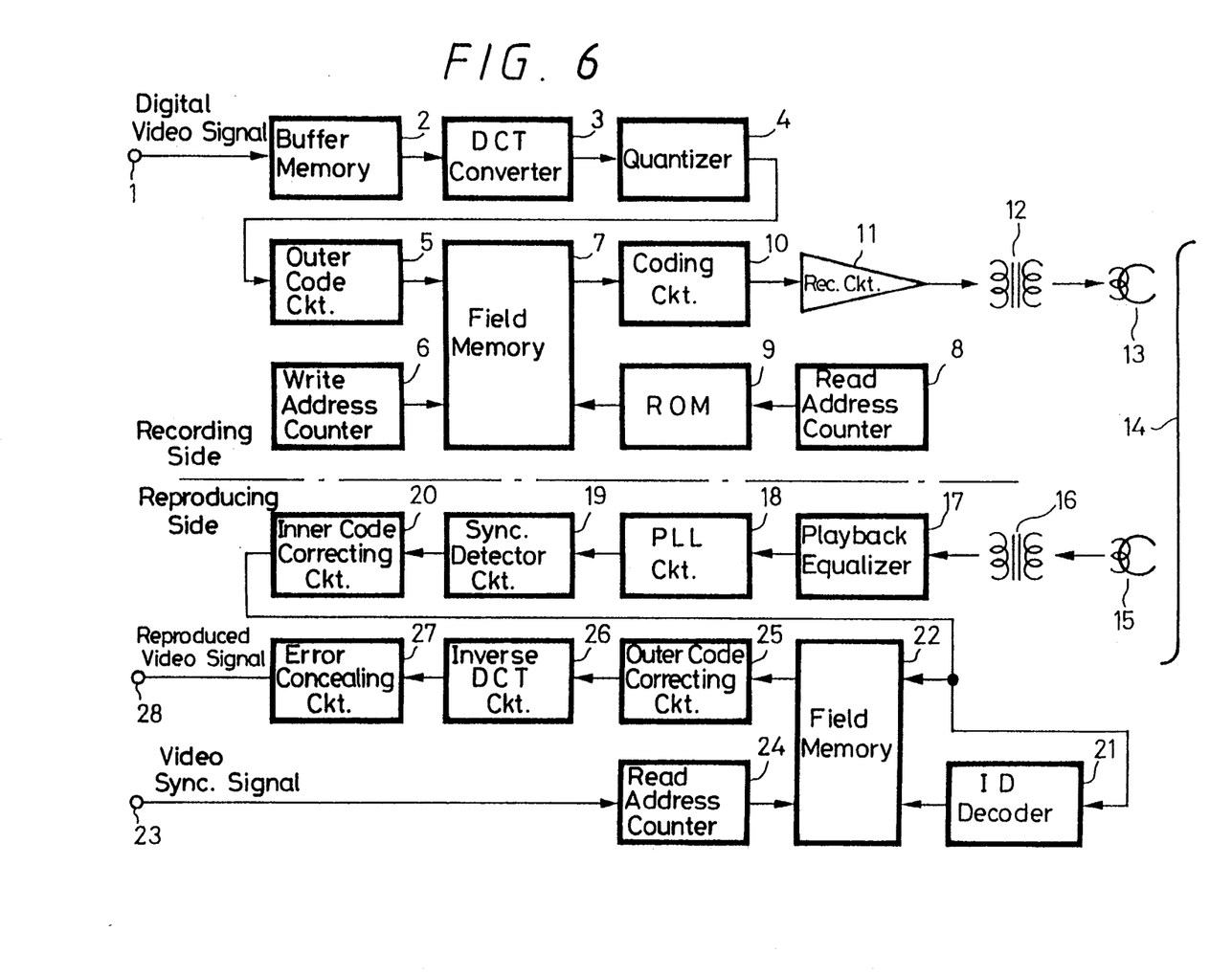
FIG. 6 is a block diagram showing an information data recording apparatus according to an embodiment of the present invention.

As shown in FIG. 6, there is provided an input terminal 1 to which a digital video signal is input. The digital video signal applied to the input terminal 1 is stored in a buffer memory 2 and then read out therefrom by a DCT (discrete cosine transform) circuit 3 at the block unit of 4 rows ×4 columns, for example, thereby converted into spatial frequency data. The spatial frequency data, i.e., transform coefficient is supplied to a quantizer 4 and quantized by the quantizer 4.

The discrete cosine transform and the quantization obtained by the discrete cosine transform will be described. The discrete cosine transform is one of band compression systems that are very useful for a video signal. The discrete cosine transform makes effective use of a correlation of video signal, in which an amount of recording information is reduced by the band compression and a recording time of a magnetic tape can be extended.

Figure 7A:
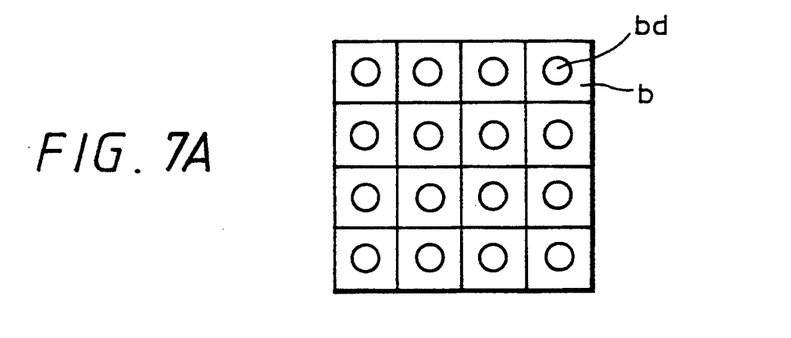
FIGS. 7A through 7D are respectively diagrams showing a discrete cosine transform, and to which references will be made in explaining operation of the embodiment of the present invention.
Figure 7B:
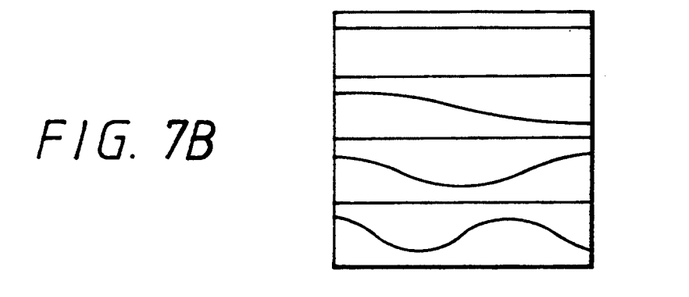

As shown in FIG. 7A, the digital video signal, temporarily stored in the buffer memory 2 is read out therefrom at the unit of block b composed of block data bd of 4 rows ×4 columns and the block b is processed in a cosine transform fashion. As shown in FIG. 7B, a cosine wave whose frequency is increased at an interval of 0.5 cycle from zero cycle is sampled at a plurality of sampling points to thereby sequentially calculate a discrete cosine transform matrix in the horizontal and vertical directions. Thus, there is obtained two-dimensional spatial frequency data, i.e., transform coefficient F (u, v).

Figure 7C:
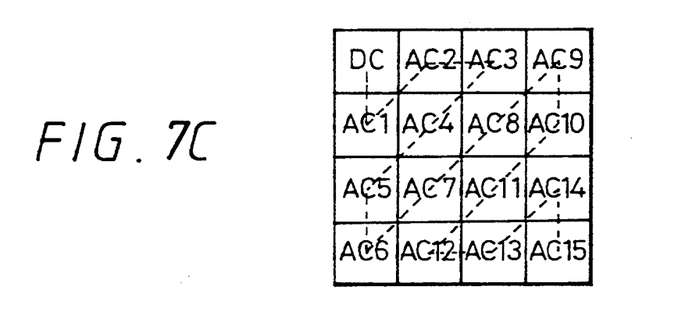
Figure 7D:
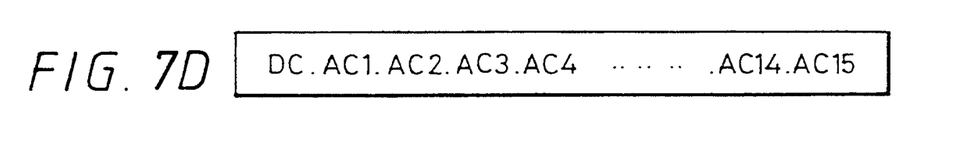

The transform coefficient thus obtained by the discrete cosine transform is quantized by the quantizer 4 shown in FIG. 6. This quantizer 4 quantizes a transform coefficient (direct current component) DC and transform coefficients (alternate current components) AC1, AC2, AC3, . . . , AC15 from low to high band sequentially in a zigzag-scan fashion as shown by dashed lines in FIG. 7C to thereby convert the same into codes as shown in FIG. 7D. At that time, by making effective use of characteristics of image data, i.e., characteristics that the level of a high frequency signal component of data is small as compared with that of a low frequency signal component of data and that a fluctuation of a high frequency signal component of data cannot be visually confirmed without difficulty, the quantization level is made coarse from low to high band to reduce an information amount, thereby effecting the band compression. Generally, there is determined a quantized coefficient region that is to be coded. Then, only the region of the transform coefficient thus quantized is coded and transmitted to a transmission line or storage system.

Referring back to FIG. 6, the quantized data (DCT data) from the quantizer 4 is supplied to an outer code circuit 5. The outer code circuit 5 adds a burst error correction code to the quantized data from the quantizer 4 and writes the quantized data added with the burst error correction code in a field memory 7 on the basis of a write address signal from a write address counter 6. The quantized data written in the field memory 7 is sequentially read out therefrom on the basis of an address signal that is output from a ROM (read only memory) 9 in response to a count value from a read address counter 8.

Figure 8:
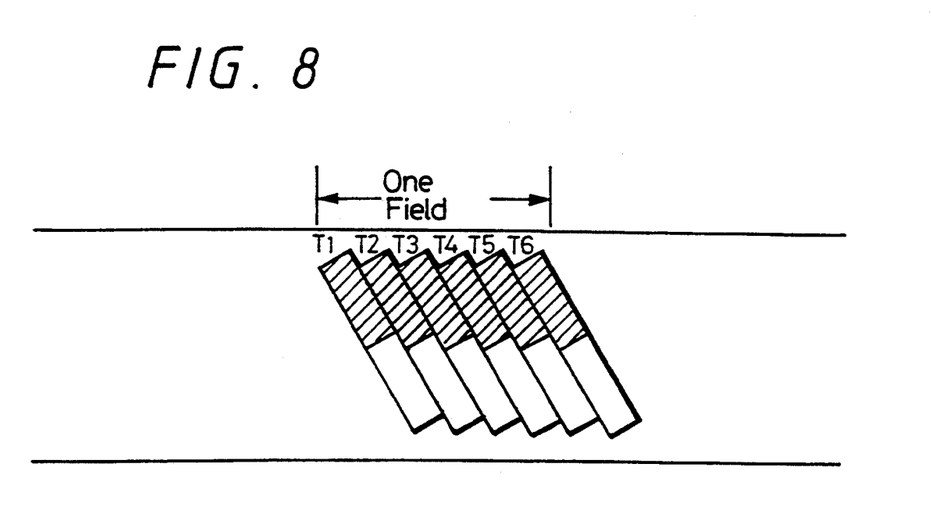
FIG. 8 is a diagram used to explain the condition that quantized data is written on the magnetic tape.

Operation that the quantized data is written on the magnetic tape 14 on the basis of the address signal from the ROM 9 will be described with reference to FIG. 8. FIG. 8 shows an example of video tracks T1, T2, T3, . . . , T6 formed when a signal of one field, for example, is recorded. Of the video tracks T1 to T6, areas which are not shown hatched represent areas (first half portions of video tracks) in which a waveform of a reproduced output is deteriorated considerably when the reproducing head 15 just starts to scan the video tracks upon playback and areas shown hatched represent areas (second half portions of video tracks) in which the tracking of the reproducing head 15 can be stabilized, respectively.

In this embodiment, when the video tracks T1 to T6 are sequentially formed by recording the signals, a high frequency signal component of data read out from the field memory 7 is recorded on the video tracks T1 to T6 at their portions, not hatched, (first half portions of tracks) in which a waveform of a reproduced output is considerably deteriorated by the reproducing head 15 when the reproducing head 15 just starts the playback). On the other hand, a low frequency signal component of data read out from the field memory 7 is recorded on the video tracks T1 to T6 at their hatched portions (second half portions of video tracks) in which the reproducing head 15 can stably reproduce the tracks.

As earlier noted, a high frequency signal component of data is less affected visually and a low frequency signal component of data is considerably affected visually. In concurrent therewith, if the quantized data is processed in an inverse discrete cosine transform fashion and reconverted into the original video signal when an error occurs in the quantized data because a waveform of a reproduced output is deteriorated by the mistracking of the reproducing head 15 upon playback, then an amount that a high frequency signal component of data is deteriorated in picture quality by the resultant error is comparatively small or a deteriorated picture quality can be concealed relatively easily. Whereas, a low frequency signal component of data is considerably deteriorated in picture quality and a deteriorated picture quality cannot be concealed with ease.

Of the quantized data, a high frequency signal component of data is recorded on the video tracks T1 to T6 at their first half portions in which a waveform of a reproduced output is considerably deteriorated by the reproducing head 15 when the reproducing head 15 just starts to scan the track and a low frequency signal component of data is recorded on the tracks T1 to T6 at their second portions in which the tracking of the reproducing head 15 is stabilized. Therefore, even if a reproducing error occurs when a waveform of a reproduced output is deteriorated by the contact of the reproducing head 15, the reproducing error occurs only in a high frequency signal component of data. Thus, a picture quality of a reproduced picture can be prevented from being affected from a visual sense standpoint.

More specifically, in synchronism with the timing at which the video tracks are formed by recording the signal by the recording head 13, as shown in FIG. 8, the ROM 9 outputs an address signal of area in which a high frequency signal component of data of the data stored in the field memory 7 is recorded at the timing in which the first half portion of the track is recorded and outputs an address signal of area in which a low frequency signal component of data of the data stored in the field memory 7 is stored at the timing in which the second half portion of the video track is recorded on the basis of a count value from the read address counter 8.

Data are sequentially read out from the field memory 7 in response to the address signal from the ROM 9 from a high frequency signal component of data to a low frequency signal component of data. The quantized data thus read is supplied to a coding circuit 10.

Figure 9:
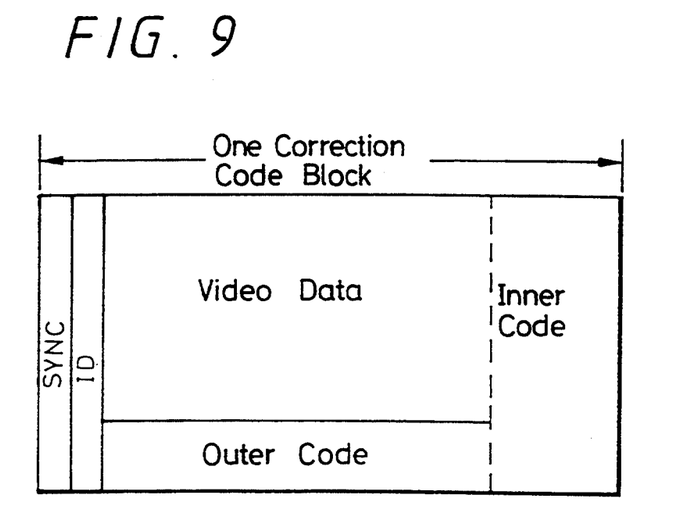
FIG. 9 is a diagram used to explain an arrangement of an error correction code block.

The coding circuit 10 processes the quantized data added with the outer code data from the field memory 7 in various code processing fashions in order to correct and detect a playback error upon playback. FIG. 9 shows an example of a format of a correction code block that results from the above code processing.

Referring to FIG. 9, there is shown one correction code block. As shown in FIG. 9, this one correction code block comprises a sync. (synchronizing) code, an ID (identification) code, video data, an outer code and an inner code. The inner code is a correction code that is used to correct consecutive data within the sync. block and which is continuously recorded on the magnetic tape 14 as data. The inner code is mainly utilized to correct a random error. The outer code is a correction code that is used to correct discrete data of each sync. block. The outer code is recorded on the magnetic tape 14 at its portion distant from the portion where data is recorded and is mainly utilized to correct a burst error. This error correction code is data that is affected a little when an error occurs. More specifically, even when the error correction code is destroyed, if there remains normal video data, then the video signal can be reproduced without trouble. In particular, the outer code shown in FIG. 9 constructs a sync. block different from the video data and can be recorded at a proper position on the video track.

According to a second embodiment of the present invention, similarly as described above with reference to FIG. 8, when the respective video tracks T1 to T6 are formed in that order by sequentially recording the signals, the outer code that is affected relatively a little when an error occurs is recorded on the video tracks T1 to T6 at their portions, not shown hatched, (first half portions of the video tracks T1 to T6) in which a waveform of a reproduced output is considerably deteriorated in amplitude when the reproducing head 15 just starts to scan the track upon playback.

The outer code is affected relatively a little when an error occurs as described above. As shown in FIG. 8, this outer code is recorded on the video tracks T1 to T6 at their first half portions in which a waveform of a reproduced output is considerably deteriorated in amplitude when the reproducing head 15 just starts to scan the track upon playback. Thus, even when a reproducing error occurs and the reproducing error is increased, the amount that the picture quality of the reproduced video signal is deteriorated due to the reproducing error can be reduced because the outer code that is relatively less affected by the error occurred is recorded on the track at its portion in which a waveform of a reproduced output is considerably deteriorated in amplitude when the reproducing head 15 just starts to scan the track upon playback.

As described above, the ROM 9 outputs the address signal of the area in which the outer code in the data stored in the field memory 7 is stored at the timings in which the video tracks T1 and T6 are formed in synchronism with the timing at which the video track is formed by recording the signal by the recording head 13 in response to the count value from the read address counter 8.

The outer code is sequentially read out from the field memory 7 in response to the address signal from the ROM 9 and the address signal thus read is supplied to the coding circuit 10.

Referring back to FIG. 6, the quantized data and the burst error correction outer code supplied to the coding circuit 10 are added with the random error correction code, the sync. code, the ID code or the like, converted from an 8-bit parallel signal to a one-bit serial signal having a clock frequency 8 times as high as the frequency of the 8-bit parallel signal and then supplied to a recording circuit 11. The recording circuit 11 supplies a recording current through a rotary transformer 12 to the recording head 13 mounted on the rotary drum (not shown) in response to the signal from the coding circuit 10, thereby recording the recording signal on the magnetic tape 14.

Operation that the magnetic tape 14 on which the recording signal is recorded is reproduced will be described below. The recording signal that is recorded on the magnetic tape 14 so as to form the oblique video tracks is sequentially reproduced from the first half portion to the second half portion of the video track by the playback head 15. At that time, a high frequency signal component of video data or outer code is recorded on the first half portions of the video tracks and a low frequency signal component of data is recorded on the second half portions of the video tracks so that, even if the reproducing error occurs because a waveform of a reproduced output is deteriorated in amplitude when the reproducing head 15 just starts to scan the track upon playback, a picture quality can be prevented from being destroyed from a visual sense standpoint because a high frequency signal component of data or outer code that is less affected visually is recorded on the track at its first half portion in which a waveform of a reproduced output is considerably deteriorated in amplitude when the reproducing head 15 just starts to scan the track upon playback.

A reproduced signal that is reproduced by the playback head 15 (the recording head is also served as the reproducing head and vice versa) is supplied through a rotary transformer 16 to a playback equalizer 17. The reproduced signal thus equalized in waveform by the playback equalizer 17 is supplied to a PLL (phase-locked loop) circuit 18. The PLL circuit 18 reproduces a clock on the basis of the reproduced signal from the playback equalizer 17. Then, a reproduced signal from the PLL circuit 18 is supplied to a sync. detector circuit 19.

The sync. detector circuit 19 reproduces a block sync. signal to convert one-bit serial data from the PLL circuit 18 into 8-bit parallel data having a $\frac{1}{8}$-times clock frequency. The 8-bit parallel data is supplied to an inner code correcting circuit 20. The inner code correcting circuit 20 corrects a random error by using the 8-bit parallel data from the sync. detector circuit 19 and supplies the 8-bit parallel data thus corrected in random error to an ID decoder 21 and a field memory 22.

The ID decoder 21 decodes the above ID code and generates an address signal on the basis of the ID code thus decoded. This address signal is supplied to a field memory 22 so that the quantized data and the outer code are written in the field memory 22.

As shown in FIG. 6, a video sync. signal is supplied to an input terminal 23. The video sync. signal applied to the input terminal 23 is supplied to a read address counter 24. The read address counter 24 generates a read address signal on the basis of the video sync. signal supplied to the input terminal 23. The read address signal thus read is supplied to the above field memory 22. Accordingly, the quantized data and the outer code written in the field memory 22 are read out therefrom and the quantized data and outer code thus read are supplied to an outer code correcting circuit 25.

The outer code correcting circuit 25 corrects a burst error of the quantized data similarly supplied from the field memory 22 by using the outer code supplied thereto from the field memory 22. The quantized data in which the burst error was corrected is supplied to an inverse DCT circuit 26.

The inverse DCT circuit 26 converts the quantized data from the outer code correcting circuit 25 into the transform coefficient, converts the transform coefficient into original image data and supplies the original image data to an error concealing circuit 27. The error concealing circuit 27 conceals an error of the image data from the inverse DCT circuit 26 and outputs the error-concealed video signal from an output terminal 28 as a reproduced video signal. The reproduced video signal is supplied through the output terminal 28 to a monitor (not shown) or the like, thereby being displayed on a picture screen of the monitor as a reproduced picture.

As described above, according to this embodiment, when the recording signal is recorded by the recording head 13, of the recording signal, a high frequency signal component of data that is less affected from a visual sense standpoint or the outer code that is less affected by the occurrence of error is recorded on the first half portion of the track formed by recording the recording signal by the recording head 13, i.e., in the portion in which a waveform of a reproduced output is considerably deteriorated in amplitude when the reproducing head 15 just starts to scan the track upon playback. Also, a low frequency signal component of data that is affected considerably from a visual sense standpoint, i.e., a low frequency signal component of data that is considerably affected in picture quality from a visual sense standpoint is recorded on the track at its second half portion in which the contact of the reproducing head 15 is relatively stabilized. Thus, even if a reproducing error occurs and increases because a waveform of a reproduced output is deteriorated in amplitude when the reproducing head 15 just starts to scan the track upon playback, then the amount that the picture quality of the reproduced picture is deteriorated due to the reproducing error can be remarkably reduced.

In the case of FIG. 8, the first half portion and the second half portion of the track are assigned with a ratio of substantially 50% and 50% because a distribution of a signal is determined such that a low frequency signal component is selected to be ½ of the total signal amount, a high frequency signal component is selected to be ½ of the total signal amount and the outer code is selected to be 1/6 of the total signal amount. The present invention is not limited thereto and the following variant is also possible. That is, when an apparatus such as a digital video tape recorder or the like is designed in actual practice, a low frequency signal component of data and a high frequency signal component of data may not separated but only the outer code may be recorded on the first half portion of the track and the low frequency signal component of data and the high frequency signal component of data may be recorded together on the second half portion of the track. In this case, a range of about 10 to 20% is assigned to an outer code area.

While the video signal is recorded on the magnetic tape 14 as described above, the present invention is not limited thereto and may be applied to the case that an audio signal and other various informations are recorded on the magnetic tape 14.

According to the present invention, since an information signal is recorded on a recording medium while the influence of playback error and the contact condition of the rotary head with the recording medium are taken into consideration, even if a playback error occurs in the first half portion of the track when a waveform of a reproduced output is deteriorated in amplitude when the reproducing head just starts to scan the track upon playback, an amount that the picture quality of the reproduced picture is deteriorated due to the occurrence of the reproducing error can be reduced considerably.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An apparatus for recording a digital signal on a magnetic tape, comprising:
   means for orthogonal converting said digital signal to produce an orthogonally converted digital signal;
   means for quantizing said orthogonally converted digital signal to produce quantized data;
   means for generating outer data in response to said quantized data for correction of said quantized data and for combining the same to said outer data;
   means for rearranging an order of said quantized data and said outer data so that said outer data precedes said quantized data on each track formed on said magnetic tape when recorded; and
   record heads coupled to said means for rearranging for recording said outer data at a beginning area of each successive oblique track formed on said magnetic tape and for recording said quantized data at a succeeding area after said beginning area of each said successive oblique track formed on said magnetic tape.

2. The apparatus according to claim 1, in which said rearranging means includes a memory, a write address counter and a read address counter.

3. The apparatus according to claim 2, in which said orthogonal converting means is a DCT (discrete cosine transform) converter.

4. The apparatus according to claim 3, in which said digital signal includes at least a digital video signal.

5. The apparatus according to claim 4, in which said record heads include a plurality of heads for forming a plurality of tracks corresponding to one field of said digital video signal and said outer data.

6. The apparatus according to claim 1, wherein said means for rearranging arranges a high frequency component and a low frequency component of said quantized data such that said high frequency component precedes said low frequency component on each said track formed on said magnetic tape when recorded and wherein the record heads record said low frequency component at a first location of each said track and record said high frequency component at a second location preceding said first location of each said track.

7. The apparatus according to claim 6, wherein said means for storing and reading reads out a high frequency component and a low frequency component of said quantized data in an order such that said high frequency component precedes said low frequency component on each said track formed on said magnetic tape when recorded and wherein the record heads record said low frequency component at a first location of each said track and record said high frequency component at a second location preceding said first location of each said track.

8. An apparatus for recording and reproducing a digital video signal on and from a magnetic tape, comprising:
   means for DCT converting said digital video signal to generate a DCT converted digital video signal;
   means for quantizing said DCT converted digital video signal to produce quantized data;
   means for generating outer data in response to said quantized data for correction of said quantized data and for adding the same to said outer data;
   means for storing said quantized data and said outer data so that the same corresponding to one vide field is stored, and for reading out said stored data in an order such that said outer data precedes said quantized data on each track formed on said magnetic tape when recorded;

record heads for recording said outer data at a beginning area of each successive oblique track formed on said magnetic tape and for recording said quantized data at a succeeding area after said beginning area of each said successive oblique track formed on said magnetic tape;

means for reproducing said digital video signal recorded on said magnetic tape;

means for equalizing a waveform of said reproduced signal;

means for reproducing a clock signal on the basis of said reproduced signal from said equalizing means;

means for converting said equalized reproduced signal in the form of one-bit serial data to 8-bit parallel data;

means for correcting a random error of said 8-bit parallel data;

identification code decoding means for decoding an identification code and generating an address signal on the basis of the decoded identification code;

means for receiving and storing said quantized data and said outer data correction code contained within said corrected 8-bit parallel data;

means for correcting a burst error of said stored quantized data by using said outer data correction code;

means connected to said correcting means for inverse-orthogonal transforming said corrected quantized data; and error correcting means for correcting an error of an output signal of said inverse-orthogonal transforming means before said error-corrected output signal is displayed as a reproduced picture.

9. The apparatus according to claim 8, in which said receiving and storing means is a field memory.

10. The apparatus according to claim 9, in which said means for reproducing a clock signal is a phase-locked loop (PLL) circuit.

11. The apparatus according to claim 10, in which said converting means is a synchronizing detector.

12. The apparatus according to claim 11, in which said inverse-orthogonal transforming means is an inverse discrete cosine transform circuit ($DCT^{-1}$ circuit).

13. An apparatus for reproducing a digital signal from successive oblique tracks formed on a magnetic tape having outer data correction code stored at a beginning area of each said successive oblique track and having quantized data stored at a succeeding area after said beginning area of each said successive oblique track, comprising;

means for reproducing said digital signal recorded on said magnetic tape;

means for equalizing a waveform of said reproduced digital signal;

means for reproducing a clock signal on the basis of said reproduced signal from said equalizing means;

means for converting said equalized reproduced signal in the form of one-bit serial data to 8-bit parallel data;

means for correcting a random error of said 8-bit parallel data;

identification code decoding means for decoding an identification code and generating an address signal on the basis of the decoded identification code;

means for receiving and storing said quantized data and said outer data correction code contained within said corrected 8-bit parallel data;

means for correcting a burst error of said stored quantized data by using said outer data correction code;

means connected to said correcting means for inverse-orthogonal transforming said corrected quantized data; and error correcting means for correcting an error of an output signal of said inverse-orthogonal transforming means before said error-corrected output signal is displayed as a reproduced picture.

14. The apparatus according to claim 13, in which said receiving and storing means is a field memory.

15. The apparatus according to claim 14, in which said means for reproducing a clock signal is a phase-locked loop (PLL) circuit.

16. The apparatus according to claim 15, in which said converting means is a synchronizing detector.

17. The apparatus according to claim 16, in which said inverse-orthogonal transforming means is an inverse discrete cosine transform circuit ($DCT^{-1}$ circuit).

* * * * *